(12) United States Patent
Sauer

(10) Patent No.: US 6,507,311 B2
(45) Date of Patent: Jan. 14, 2003

(54) DEVICE AND PROCESS FOR MEASURING DISTANCE AND SPEED

(75) Inventor: Thomas Sauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/864,164

(22) Filed: May 25, 2001

(65) Prior Publication Data

US 2001/0054976 A1 Dec. 27, 2001

(30) Foreign Application Priority Data

May 25, 2000 (DE) .......................... 100 26 032

(51) Int. Cl.[7] .......................... G01S 13/00; G01S 13/58; B60T 7/16; B62D 1/24
(52) U.S. Cl. .......................... 342/70; 342/109; 180/169
(58) Field of Search .................. 342/70–72, 109–116, 342/127–130, 162; 180/167–169

(56) References Cited

U.S. PATENT DOCUMENTS

| 5,508,706 A | * | 4/1996 | Tsou et al. .................. 342/192 |
| 5,619,208 A | * | 4/1997 | Tamatsu et al. ............... 342/70 |
| 5,625,362 A | | 4/1997 | Richardson |
| 5,757,308 A | * | 5/1998 | Lissel et al. .................. 342/70 |
| 6,311,123 B1 | * | 10/2001 | Nakamura et al. ............ 701/96 |
| 6,317,073 B1 | * | 11/2001 | Tamatsu et al. ............... 342/70 |
| 6,396,436 B1 | * | 5/2002 | Lissel et al. .................. 342/70 |

FOREIGN PATENT DOCUMENTS

| DE | 19922411 | 10/2000 |
| JP | 07191133 | 7/1995 |
| JP | 07098375 | 8/1995 |

OTHER PUBLICATIONS

European Search Report with translation thereof.

* cited by examiner

Primary Examiner—Thomas H. Tarcza
Assistant Examiner—Brian Andrea
(74) Attorney, Agent, or Firm—Crowell & Moring LLP

(57) ABSTRACT

A device and process for measuring distances and/or speeds between a motor vehicle and several objects, like mobile targets and fixed targets, has an FMCW radar system, where the motor vehicle transmits a signal, whose transmitting frequency is modulated with at least two frequency ramps. A device detects the receiving signals from the objects and determines the respective straight lines and the intersecting points of these straight lines in a speed-distance diagram. A sorting device sorts out the intersecting points from fixed targets and the related straight lines. A device outputs the distances and/or the speeds, which correspond to the other intersecting points.

13 Claims, 3 Drawing Sheets

DEVICE AND PROCESS FOR MEASURING DISTANCE AND SPEED

BACKGROUND AND SUMMARY OF THE INVENTION

This application claims the priority of German Application No. 100 26 032.2, filed May 25, 2000, the disclosure of which is expressly incorporated by reference herein.

The invention relates to a device and a process for measuring distances and speeds and, in particular, for measuring distances and speeds between a motor vehicle and several objects, such as mobile targets (other motor vehicles) and fixed targets.

German Patent document DE 196 46 228 A1 describes a process for measuring the distance between two objects. According to this process, an object, for example a motor vehicle, emits radar signals FMCW (=frequency modulation continuous wave), which are reflected in part by a second object, e.g. from a leading vehicle. The reflected signal is picked up; and a differential signal is formed from both signals. The process, described in this patent, can be used especially in the near range and in the presence of several targets. The intermediate frequency signal is evaluated by means of the maximum entropy method.

German Patent document DE 42 44 608 A1 describes a radar system-based process for measuring distances and relative speeds between a motor vehicle and impediments in the direction of travel. This prior art process carries out four process steps altogether, wherein three measurements serve to detect potential impediments and a fourth measurement sorts out ghost and fictive impediments that are generated during the evaluation.

The present invention is based on the problem of providing a device and a process, with which it is possible to measure accurately the distance and/or the speed between a motor vehicle and several objects, while avoiding false detections.

This problem is solved by a device and process for measuring the distances and/or speeds between a motor vehicle and several objects, like mobile targets. The device includes: an FMCW radar system, where the motor vehicle transmits a signal, whose transmitting frequency is modulated with at least two frequency ramps; a device for detecting the receiving signals from the objects and for determining the respective straight lines and the intersecting points of these straight lines in a speed-distance diagram; a device for sorting out the intersecting points from fixed targets and the related straight lines; and a device for the output of the distances and/or the speeds, which correspond to the other intersecting points.

The invention proceeds from the basic idea of sorting out the radar signals, reflected from the fixed targets, during the evaluation process and of evaluating the measurement results for the mobile targets.

Other objects, advantages and novel features of the present invention will become apparent from the following detailed description of the invention when considered in conjunction with the accompanying drawings.

DETAILED DESCRIPTION OF THE DRAWINGS

The invention and the related fundamentals of an FMCW radar system are explained in detail below. It can be used especially in conjunction with an ACC (adaptive cruise control) motor vehicle guidance system, installed into motor vehicles. However, the invention can also be used independently thereof. A motor vehicle guidance system comprises in essence a conventional cruise control system and a sensor so that the motor vehicle speed can be adjusted automatically to the traffic ahead. In most ACC systems, a radar system is used as the sensor, since it is resistant to dirt and bad weather conditions. According to the invention, the FMCW (frequency modulation continuous wave) radar system is used. In the known FMCW radar system it is not always possible to obtain reliable radar detection, especially when several targets are present.

In principle, each radar system measures the distance to a target over the transit time of the reflected waves. Since the outbound and return paths have to be taken into consideration, it holds for the distance: distance=total path/ 2=transit time×speed of light/2.

In an FMCW radar system a signal, whose frequency increases linearly, is transmitted over a long period of time. A wave, which starts at frequency $f_a$ and is reflected, impinges in the receiver on an oscillator signal, which already has a frequency $f_b$ owing to the frequency modulation. Both signals are mixed together. The result is an intermediate frequency (ZF) signal with the frequency $f_b-f_a$. A spectral analysis yields the frequency spectrum of the ZF signal: a peak in the spectrum corresponds to a detection of the target; and the transit time of the wave can be calculated from the position of the peak (=$f_b-f_a$), using the known rate of frequency change.

Figure 1A:
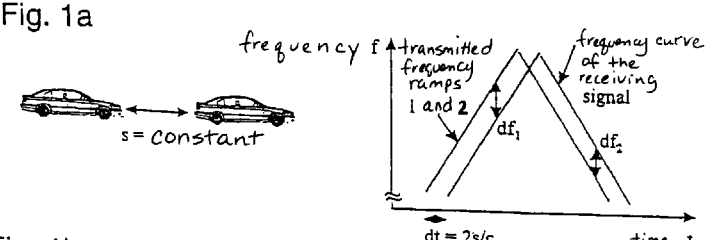
FIGS. 1a–c depict the frequency curve of a transmitting signal and a receiving signal and the related spectra with reference to three examples.

FIG. 1a depicts the frequency curve of the transmitted signal and the received signal and the related spectra using the example of two vehicles, driving one behind the other at a constant interval. In particular, the transmitted signal exhibits a frequency ramp 1 with an upward slope and a frequency ramp 2 with a downward slope. Over time, the frequency curve of the received signal is shifted by the amount dt. The time delay dt is equivalent to the transit time of the signal, which travels twice the distance (2s), where the speed of propagation is assumed to be the speed of light (c). The resulting intermediate frequency signal ($df_1$ or $df_2$) is a measure for the distance between the two motor vehicles. The spectrum for the ramp 1 and the ramp 2 is also depicted in FIG. 1a.

Figure 1B:
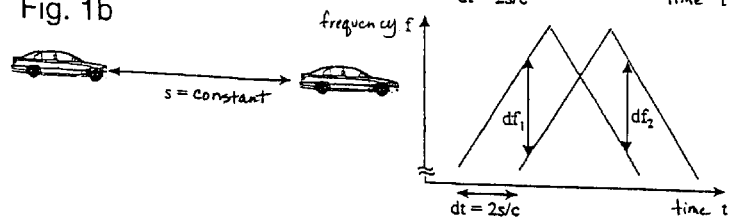
Figure 1B:
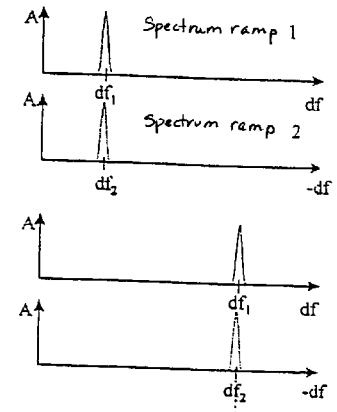

FIG. 1b is equivalent in essence to FIG. 1a. Here, the constant distance between the two vehicles is greater, and thus the value for the signal transit time dt and also the intermediate frequency signal ($df_1$ or $df_2$) is greater.

Figure 1C:
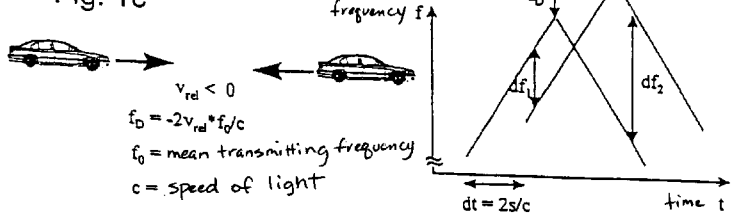
Figure 1C:
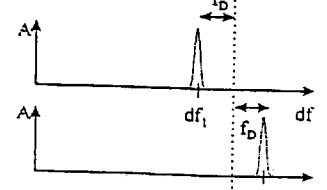

FIG. 1c relates to the example, where two vehicles, driving one behind the other, are driving at different speeds; and hence the distance between them changes continuously. In this respect, it is assumed that the relative speed $V_{rel}$ is less than 0, that is, the distance between the two vehicles decreases continuously. This observation always holds true if the vehicle with the FMCW radar system and the target move toward or away from each other.

As the vehicles move closer together, the frequency of the reflecting signal is shifted to higher frequencies; as the vehicles move farther apart, it is shifted to lower frequencies. The amount of the frequency shift is in direct proportion to the relative speed. This is the so-called Doppler effect. In order to sort out at this stage the frequency shift by means of the modulation and the frequency shift by means of the Doppler effect, another signal with decreasing frequency is transmitted and evaluated.

At this stage, simple linear algebra can be used to calculate the distance and the relative speed of the target from the positions of the peaks in the spectra of rising and falling frequency ramps. The speed-distance diagram of FIG. 2 is a graphic interpretation of this situation.

Figure 2:
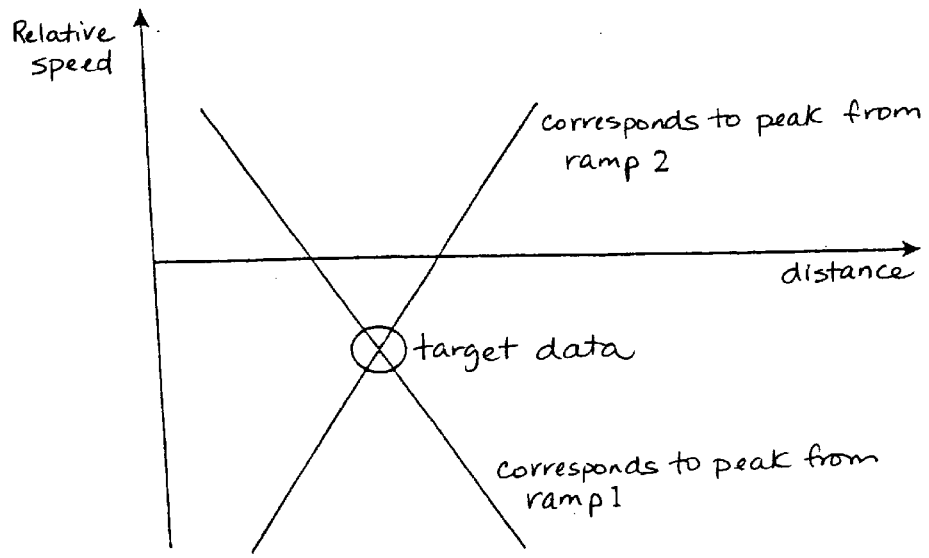
FIG. 2 depicts a speed-distance diagram in accordance with a frequency curve with two ramps, as shown in FIG. 1c, when one target is present.

In particular, FIG. 2 depicts a straight line with a downward slope, which is equivalent to the peak for the ramp 1 in FIG. 1c; and a straight line with an upward slope, which is equivalent to the peak for the ramp 2 in FIG. 1c. In this example, there is only one target. The intersecting point of the two straight lines corresponds to the relative speed between the two vehicles and the distance at a defined point in time.

Figure 3:
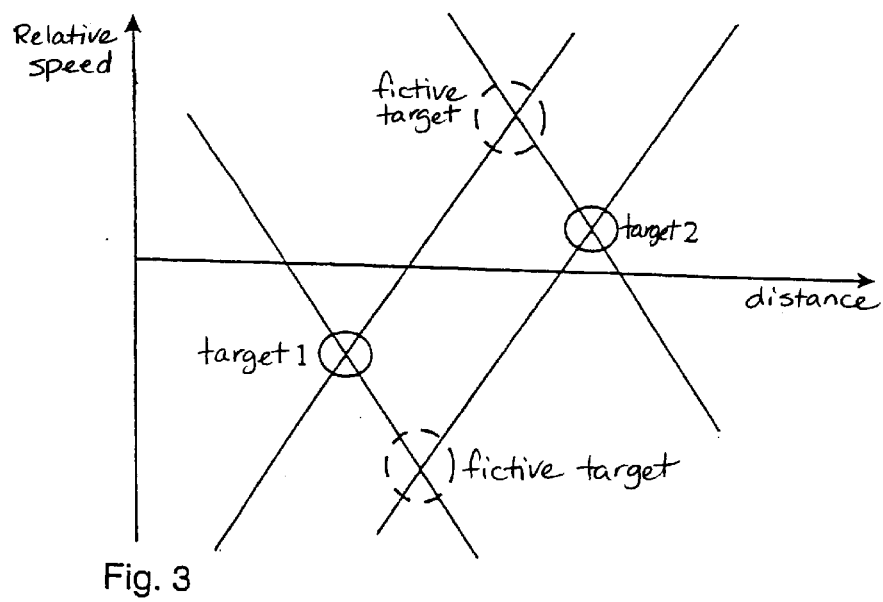
FIG. 3 depicts a speed-distance diagram in accordance with FIG. 2, when two targets are present.

As evident from FIG. 3, the two ramp FMCW radar system detects altogether four straight lines, when there are two targets and, in particular, two straight lines with an identical downward slope and two straight lines with an identical upward slope. In addition to the intersecting points for the target 1 and the target 2 (circles drawn with a solid line), there are two other intersecting points, which represent two fictive targets (circles drawn with a dashed line).

Figure 4:
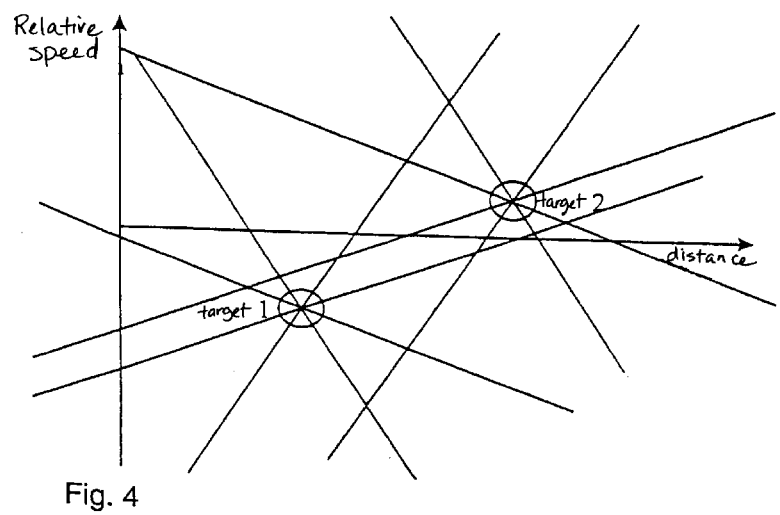
FIG. 4 depicts a speed-distance diagram for an FMCW radar system, using four frequency ramps, when two targets are present.

To rule out this false detection, other frequency ramps, whose amount of slope is larger or smaller, can be introduced. FIG. 4 depicts the two target situation of FIG. 3 with a total of four frequency ramps. Here the actual targets 1 and 2 can be clearly identified with a group of four intersecting points. In other words, only the intersecting points of four straight lines are altogether interpreted as one target. The four ramp FMCW process makes it possible to identify clearly as many as up to three targets. In principle, it is possible to expand the multiple target capability by means of additional frequency ramps.

Figure 5:
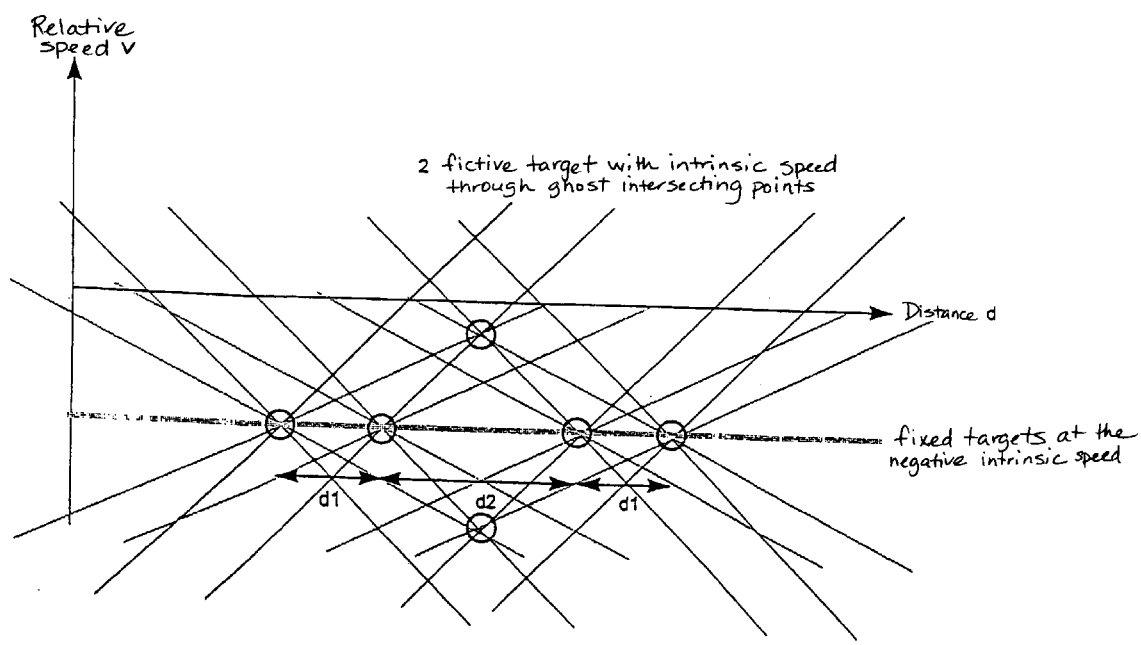
FIG. 5 depicts a speed-distance diagram for an FMCW radar system, which works with four frequency ramps, when four targets are present.

Whereas the above described four ramp FMCW process for normal driving situations, especially for straight ahead driving, permits an accurate measurement of the distance and the speed without false detections, the problem of ghost target detection increases, in particular when cornering. When cornering, the radar system detects quite intensively the peripheral edge of the road and thus many fixed targets. In conjunction with an ACC vehicle guidance system, it is possible for the ACC system to react incorrectly, since these fictive targets do, indeed, create a plausible trajectory. Furthermore, cornering causes the ACC system to predict an incorrect driving envelope next to the drive lane so that these fixed targets are seen by the ACC system as if they were lying in the vehicle's own track. According to the invention, there is no reaction to these fixed targets in order to avoid a false reaction by the ACC system. According to a preferred embodiment, the fixed targets are clearly identified in that the speed of the motor vehicle is detected; and the respective relative speed of the detected targets is compared with the speed of the motor vehicle. If the relative speed is equivalent to the negative speed of the motor vehicle, the target that is found is identified as the fixed target. FIG. 5 depicts a total of four fixed targets at the negative intrinsic speed $-vf$. Each of these fixed targets corresponds to a group of four intersecting points in the speed-distance diagram. When the fixed targets are spaced apart a defined distance, these straight lines can form in the illustrated example two other groups of four intersecting points, which correspond to two fictive targets. The upper fictive target SO, depicted in FIG. 5, corresponds to a vehicle that is driving slowly ahead. The bottom fictive target SU corresponds to an on-coming vehicle. That is, the incorrect result is produced that ahead of the vehicle there is a vehicle driving slowly ahead, to which the ACC system reacts by delaying the vehicle. This situation greatly irritates the driver and possibly the other vehicles in the rear.

FIG. 5 shows how with the four ramp FMCW radar system such a fictive target can occur. Four fixed targets have to be measured; they exhibit the following pattern. The ratio of their spacing differences must be equivalent to the ratio of the slopes of the frequency ramps that are used. This case may be regarded at first as improbable, but in the aforementioned curve situations many more than four fixed targets are measured so that one almost always finds four fixed targets that meet this condition. In addition, owing to the noisy receiver data, non-ideal groups of four intersecting points must be admitted so that it is not necessary to meet this condition precisely.

Since the fixed targets are really present, they are measured over several cycles. The consequence is that even the fictive target is detected over several measurement cycles so that a plausible trajectory is created, a feature that in turn can result in a false reaction of the ACC system in the event of a false position of the driving envelope.

An adequate, but not necessary condition for the presence of ghost intersecting points can be represented with the following equation:

$$d_1 : d_2 = \frac{\text{slope straight line 1, 2}}{\text{slope straight line 3, 4}},$$

where d1 is the distance between the first and the second fixed target and the distance between the third and the fourth fixed target, d2 is the distance between the second and the third fixed target.

According to the invention, the fixed targets are sorted out of the speed-distance diagram. In the example of the four ramp FMCW radar system, shown in FIG. 5, the targets, which exhibit a relative speed equal to $-vf$, are sorted out. vf is the motor vehicle's own speed, that is, the speed at which a vehicle moves toward a fixed target. Preferably, the targets are considered in a narrow band around the straight line, characterized by the condition $v=-vf$. This serves in particular the purpose that the noisy measurement data yield fixed targets that exhibit a relative speed that deviates noticeably from the speed $-vf$. Preferably, a range from $-0.9$ vf to $1.1$ vf is considered.

If a group of four intersecting points is found in this band, the associated straight lines are deleted from the distance-speed plane. Thus, it is guaranteed that the next search will not result in the detection of fictive targets. The corresponding fixed target is stored and entered into a detection list. Thus, it is available again for a later evaluation. As soon as the search in this band or speed range has been completed, the search for targets in the remaining distance-speed plane is continued. Since the fixed targets with their related straight lines were already removed from the plane, they cannot generate any more fictive targets.

Tests have revealed that in comparison with the prior art ACC systems, the invention can reduce the number of false reactions of the ACC system to 0.

According to the present invention, the basic idea of the detection of fixed targets in the first evaluation step can be used for any configuration of the FMCW process. In particular, the invention extends to radar systems, using two, three, four, five or more frequency ramps. The above description is merely an example using the four ramp process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for measuring distances and/or speeds between a motor vehicle and several objects, the device comprising:
    a frequency modulated continuous wave (FMCW) radar system arranged in the motor vehicle, said radar system transmitting a signal, whose transmitting frequency is modulated with at least two frequency ramps;
    a detector that detects signals received from said objects and determines respective straight lines and intersecting points of said straight lines in a speed - distance diagram;
    a device for sorting out the intersecting points from fixed targets and related straight lines determined due to the fixed targets; and
    an output device for outputting the distances and/or speeds, which correspond to other intersecting points.

2. The device according to claim 1, further comprising:
    a device for providing a speed vf of the motor vehicle; and
    wherein said sorting device sorts out the intersecting points which correspond to a speed vs, ranging from −0.9 vf to −1.1 vf.

3. The device according to claim 2, wherein the speed vs equals −vf.

4. The device according to claim 1, further comprising a storage device for storing at least one of the intersecting points and straight lines from fixed targets as a detection list.

5. The device according to claim 2, further comprising a storage device for storing at least one of the intersecting points and straight lines from fixed targets as a detection list.

6. The device according to claim 1, wherein the transmitting signal is modulated with four frequency ramps, and the intersecting points from four straight lines are evaluated.

7. The device according to claim 2, wherein the transmitting signal is modulated with four frequency ramps, and the intersecting points from four straight lines are evaluated.

8. The device according to claim 4, wherein the transmitting signal is modulated with four frequency ramps, and the intersecting points from four straight lines are evaluated.

9. A motor vehicle guidance system, comprising:
    a cruise control system; and
    a device for measuring distances and/or speeds between a motor vehicle and several objects, the device comprising:
        a frequency modulated continuous wave (FMCW) radar system arranged in the motor vehicle, said radar system transmitting a signal, whose transmitting frequency is modulated with at least two frequency ramps;
        a detector that detects signals received from said objects and determines respective straight lines and intersecting points of said straight lines in a speed - distance diagram;
        a device for sorting out the intersecting points from fixed targets and related straight lines determined due to the fixed targets; and
        an output device for outputting the distances and/or speeds, which correspond to other intersecting points;
    wherein said cruise control system is coupled with said device for measuring distances and/or speeds.

10. A process for measuring distances and/or speeds between a motor vehicle and several objects such as mobile targets and fixed targets, the process comprising the acts of:
    transmitting a signal via an FMCW radar system, said signal having a transmitting frequency modulated with at least two frequency ramps;
    detecting signals received from said objects;
    determining respective straight lines and intersecting points of said straight lines in a speed-distance diagram based on the received signals;
    sorting the intersecting points from the fixed targets and the related straight lines determined due to the fixed targets; and
    outputting the distances and/or speeds in correspondence with other of the intersecting points.

11. The process according to claim 10, further comprising the acts of:
    providing a motor vehicle speed vf; and
    sorting out the intersecting points which correspond to a speed vs, with vs ranging from −0.9 vf to −1.1 vf.

12. The process according to claim 11, further comprising the act of storing the intersecting points and/or straight lines from the fixed targets as a detection list.

13. The process according to claim 10, further comprising the act of modulating the transmitting signal with four frequency ramps, and evaluating the intersecting points from four straight lines.

\* \* \* \* \*